United States Patent [19]
Hill et al.

[11] 3,713,607
[45] Jan. 30, 1973

[54] LOAD REDUCING SPIKE FOR SUPERSONIC MISSILES

[75] Inventors: Jacques A. F. Hill, Huckleberry Hill; Richard H. Adams, Bedford, both of Mass.

[73] Assignee: The United States of America as represented by the Secretary of the Navy

[22] Filed: Aug. 15, 1968

[21] Appl. No.: 753,040

[52] U.S. Cl. .................................................. 244/3.1
[51] Int. Cl. ........ F42b 15/00, F41g 9/00, F41g 11/00
[58] Field of Search ......... 137/15.1; 244/3.1, 130, 42

[56] References Cited

UNITED STATES PATENTS

| 2,589,945 | 3/1952 | Leduc | 137/15.1 |
| 3,086,467 | 4/1963 | Gallagher et al. | 244/3.1 |
| 3,314,437 | 4/1967 | Pike | 137/15.1 |
| 3,477,455 | 11/1969 | Campbell | 137/15.1 |

FOREIGN PATENTS OR APPLICATIONS

| 884,128 | 12/1961 | Great Britain | 244/3.1 |

*Primary Examiner*—Benjamin A. Borchelt
*Assistant Examiner*—Thomas H. Webb
*Attorney*—G. J. Rubens, Arthur L. Branning and T. O. Watson, Jr.

[57] ABSTRACT

A spike protected dome for supersonic bodies as a protective against rain erosion as well as reducing drag, aerodynamic, thermodynamic and structural loading. The spike is attached to the radome and is in the form of a hollow tube, open at the forward end and perforated along its length.

5 Claims, 3 Drawing Figures

PATENTED JAN 30 1973  3,713,607
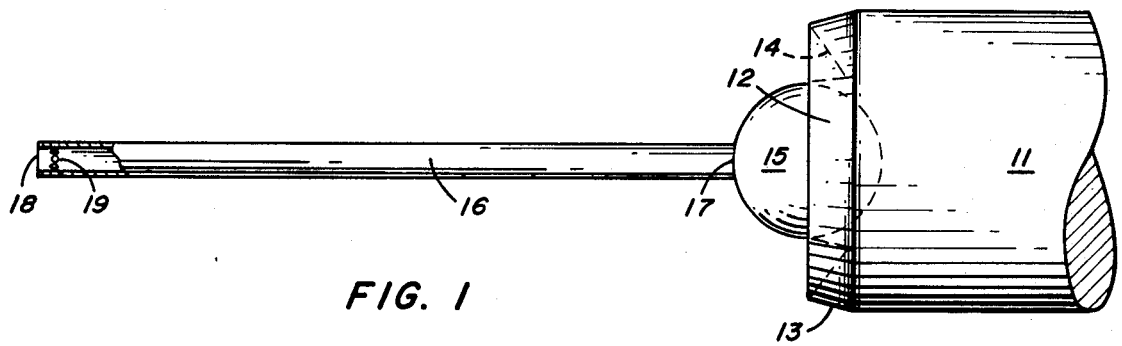
FIG. 1
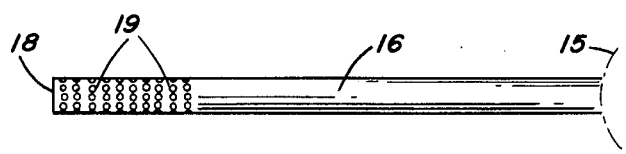
FIG. 2
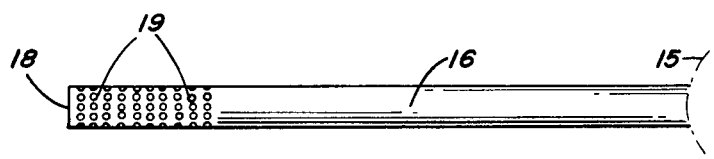
FIG. 3
INVENTORS
JACQUES A. HILL
RICHARD H. ADAMS
BY 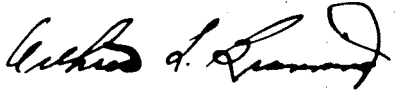
ATTORNEY 3,713,607

LOAD REDUCING SPIKE FOR SUPERSONIC MISSILES

STATEMENT OF GOVERNMENT INTEREST

The invention defined herein may be manufactured and used by or for the Government of the United States of America for governmental purposes without the payment of any royalties thereon or therefor.

BACKGROUND OF THE INVENTION

1. Field of the Invention

For a better understanding of the invention the following is basic to an understanding of the phenomenon of the spike separated flow field.

The major feature of the flow field is a dead-air region which is bounded at the base by the body itself and at the sides by a conical shear layer.

This free shear layer begins where the boundary layer on the spike separates due to a pressure rise at the dead-air region and ends at the edge of the body face where it re-attaches to form a conventional boundary layer. As the velocities are low in the separated region, this region is of near uniform pressure and is equal to the conical pressure of an equivalent cone with the angle of the separated shear layer air, with significant velocity impacts near the edge of the body face causing a local pressure rise and is turned back into the separated region. This air is turned back at a rate equal to the rate at which the air is scavenged from the dead-air region by the free shear layer.

The drag of a spiked body consists of two components: (1), the pressure drag which is simply the wave drag of an equivalent cone; and (2), the shear drag corresponding to the friction drag on the dividing streamline of the shear layer. As this shear drag cannot be transmitted to the gas at the shear layer, it acts near the body shoulder as an excess pressure where the momentum of the re-circulating flow in the shear layer is reduced to zero.

This invention is directed to the structural design of a spike for attachment to the radome or irdome of a supersonic missile.

2. Description of Prior Art

The use of a spike attached to the radome of a supersonic missile is not new. There are patents issued on this idea and they serve the purpose for which they are intended, that is, the lessening of the drag of the air on the missile. The present invention is an improvement on the structure of the spike.

SUMMARY OF THE INVENTION

The present invention seeks to artificially extend separation by the injection of ram air into the separated region.

An object of the present invention is to provide a structural form of spike that will inject ram air into the separated region and further decrease the drag.

A further object of the invention is to provide a hollow spike, open at its forward end and provided with perforation along its length so that air entering the spike through the open end may be expressed through the perforations into the separated region and reduce the drag.

It is a further object of the present invention to provide a means of mounting the spike on the radome so that it may be adjusted as to angle with the body of the missile.

It is a still further object of the present invention to provide, at the forward end of the missile body, a collar which tapers the model shoulder at approximately 15° and presents a concave face to the airstream, to aid in the reduction of aerodynamic loading.

BRIEF DESCRIPTION OF DRAWINGS

The invention is illustrated in the accompanying drawings in which:

FIG. 1 is a side elevation of the spike and showing the forward end of the missile.

FIG. 2 is a modification of the spike showing the perforations arranged in parallel planes which are normal to the length of the spike.

FIG. 3 is a view similar to FIG. 2 showing a different modification.

Referring to FIG. 1 of the drawing, a missile body 11 supports a collar 12 at its forward end. The collar is formed with an outside surface which makes an angle 13 with the outside of the missile (extended) of 15°. The collar is also formed with an angled cut 14 at its forward end to present a concave face forward and further formed to contact and brace a radome/irdome 15.

The spike which is a hollow tube 16 is sealed at its inner end 17 and open at its forward end 18. Along its length it is perforated as at 19. These perforations may be located at any point along the length of the spike and may be of different diameters. The modification shown in FIG. 2 shows the perforations arranged in parallel planes which are normal to the length of the spike while the modification of FIG. 3 shows the same arrangement in parallel planes but with the perforations of different diameters, the diameters increasing with the distance from the forward end of the spike.

In use it has been proven by tests in wind tunnels where the actual forces may be measured that the hollow spike formed with perforations reduces the drag and the aerodynamic and structural loading.

Obviously many modifications and variations of the present invention are possible in light of the above teachings. It is therefore to be understood that within the scope of the appended claims the invention may be practiced otherwise than as specifically described.

What is claimed is:

1. A missile of the supersonic type, comprising:
    a radome/irdome supported by said missile;
    a hollow spike having an open and closed end, said spike having perforations formed therein along a substantial portion of its length, the spike being attached at its closed end to said radome/irdome.

2. A missile as recited in claim 1, wherein said hollow spike is mounted for angular adjustment on said radome/irdome.

3. A missile as recited in claim 1, wherein said perforations are of different diameters.

4. A missile as recited in claim 1, wherein said perforations are arranged in parallel planes, said planes being normal to the longitudinal axis of said spike.

5. A missile as recited in claim 1, wherein the diameter of said perforations increase as the distance from the open end of said spike increases.

* * * * *